(12) United States Patent
Takasugi

(10) Patent No.: US 6,673,256 B2
(45) Date of Patent: Jan. 6, 2004

(54) WIRING INTEGRATED FLEXURE AND METHOD OF MANUFACTURING THE SAME

(75) Inventor: Satoru Takasugi, Kyoto (JP)

(73) Assignee: Suncall Corporation, Kyoto (JP)

( * ) Notice: Subject to any disclaimer, the term of this patent is extended or adjusted under 35 U.S.C. 154(b) by 0 days.

(21) Appl. No.: 10/278,951

(22) Filed: Oct. 23, 2002

(65) Prior Publication Data

US 2003/0047534 A1 Mar. 13, 2003

Related U.S. Application Data

(62) Division of application No. 09/451,672, filed on Nov. 30, 1999.

(30) Foreign Application Priority Data

Dec. 10, 1998 (JP) .............................. 10-351315
Nov. 11, 1999 (JP) ............................. 11-320763

(51) Int. Cl.[7] ........................ H01B 13/00; G11B 21/16; G11B 5/48
(52) U.S. Cl. ...................... 216/22; 360/244; 360/244.1; 360/244.2; 360/244.3
(58) Field of Search ............................. 216/13, 22, 41; 360/245, 245.3, 244.5, 244.8, 244.3, 245.8, 245.9, 246, 244.1, 244.2, 244

(56) References Cited

U.S. PATENT DOCUMENTS

| | | | |
|---|---|---|---|
| 4,305,796 A | * 12/1981 | Gagliani et al. | ............ 521/185 |
| 5,173,392 A | * 12/1992 | Miersch et al. | ............. 430/311 |
| 5,491,597 A | 2/1996 | Bennin et al. | |
| 5,687,479 A | 11/1997 | Bennin et al. | |
| 5,739,982 A | * 4/1998 | Arya et al. | ............... 360/234.5 |
| 6,134,075 A | 10/2000 | Bennin et al. | |
| 6,249,404 B1 | 6/2001 | Doundakov et al. | |

* cited by examiner

Primary Examiner—Gregory Mills
Assistant Examiner—Roberts P Culbert
(74) Attorney, Agent, or Firm—Perkins Coie LLP

(57) ABSTRACT

The present invention provides a wiring integrated flexure including a stainless-steel substrate for supporting a magnetic head slider thereon, a wiring conductor formed on the stainless-steel substrate, posts made of a flexible resin and interposed between the stainless-steel substrate and the wiring conductor for electrically isolating the wiring conductor from the stainless-steel substrate, and the posts disposed along the lengthwise direction of the wiring conductor with spacing from each other.

A method of manufacturing the wiring integrated flexure is also provided.

3 Claims, 14 Drawing Sheets

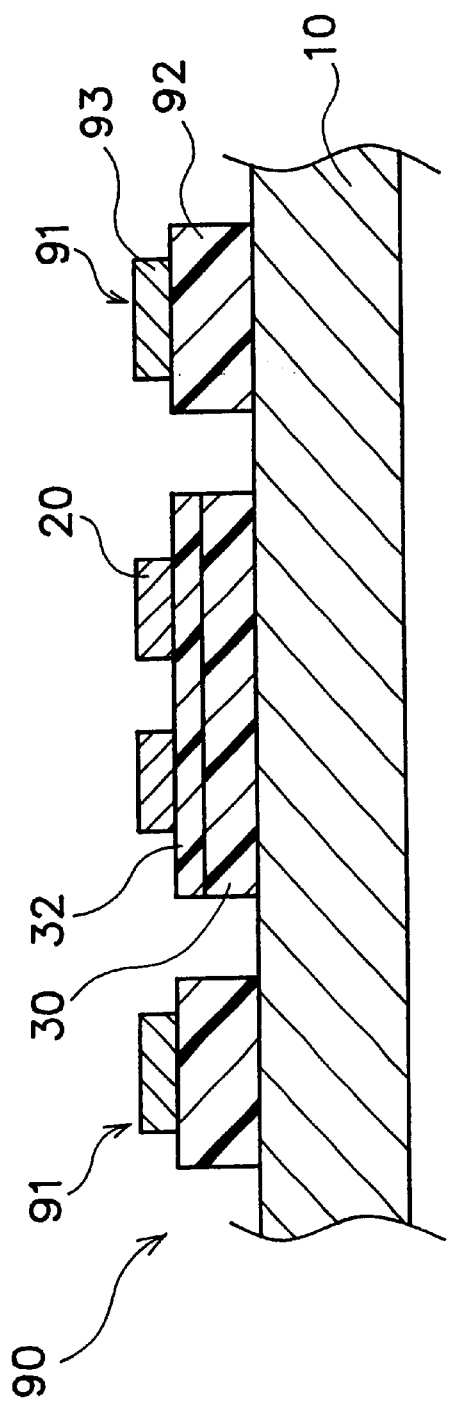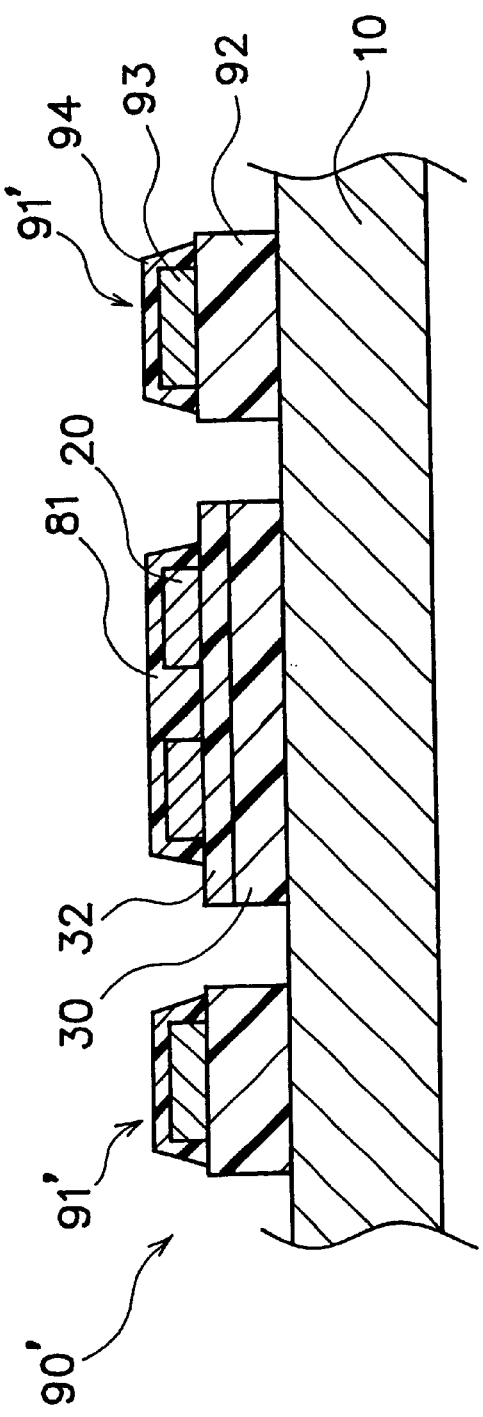

WIRING INTEGRATED FLEXURE AND METHOD OF MANUFACTURING THE SAME

The Application claims priority under 35 U.S.C. 120 and is a divisional of co-pending U.S. application Ser. No. 09/451,672, filed Nov. 30, 1999, which claims priority under 35 U.S.C. 119 to Japanese Application Nos. 10-351315 and 11-320763, filed Dec. 10, 1998 and Nov. 11, 1999, respectively, all of which are herein incorporated by reference for all purposes.

BACKGROUND OF THE INVENTION

1. Field of the Invention

2. Discussion of the Background

FIGS. 9 and 10 are respectively a perspective view and an exploded perspective view of a magnetic head suspension of a conventional type. As illustrated in these figures, a magnetic head suspension 100 of the conventional type includes, a flexure 110 having a stainless-steel substrate 111 for mounting a magnetic head slider (not illustrated) thereon and a wiring structure 112 integrally formed on the said stainless-steel substrate 111, a load beam 120 with a load-bent portion for generating a force to press the magnetic head slider against a magnetic disk, and a base plate 130 for securing the magnetic head suspension to an arm (not illustrated), in which these component parts are welded together.

The wiring structure 112 of the flexure 110 includes a terminal pad 113 closer to the slider positioned at a distal end portion of the flexure wiring, a terminal pad 115 closer to the base plate positioned at a proximal end portion of the flexure, and a signal line portion 114 extending between said terminal pads closer to the slider and the base plate. While the terminal pad 113 closer to the slider is connected to a terminal of the magnetic head slider, the terminal pad 115 closer to the base plate is connected to a terminal of a relay FPC 140 that is, in turn, connected to a preamplifier IC.

In the recent tendency towards application of a MR head to a magnetic head, an MR device is used as a reading device, and an inductive device is used as a writing device. This arrangement usually needs the flexure wiring 120 with four wires (two for reading and two for writing).

FIGS. 11(a) and 11(b) are respectively vertical cross sections of a wiring integrated flexure of a general type, the former being a cross section of the signal line portion 114 of the wiring structure 112 of the flexure, the latter a cross section of the terminal pad 113 or 115 of the wiring structure 112.

As illustrated in FIG. 11(a), a portion of the flexure 110 corresponding to the signal line portion 114 includes a stainless-steel substrate 111, a polyimide insulating layer 116 laminated on the said stainless-steel substrate 111, a Cu-wiring-conductor layer 117 laminated on the said insulating layer, and a polyimide protection layer 118 covering the said wiring conductor layer. Usually, the polyimide insulating layer 116 and the Cu-wiring-conductor layer 117 respectively have a thickness of 5 to 10 $\mu$m and a thickness of 5 to 10 $\mu$m, while the polyimide protection layer 118 has a thickness of 1 to 3 $\mu$m on the wiring conductor layer. On the other hand, the terminal pads 113 and 115 of the wiring structure 112 of the flexure each define an opening 118a in the polyimide insulating layer 118, through which the wiring conductor layer 117 is exposed.

In the above arrangement, polyimide used for the insulating layer 116 and the protection layer 118 has a different coefficient of thermal expansion from stainless steel. In addition, polyimide exhibits a moisture-absorption property. These factors may cause the variation of the mechanical characteristic, specifically the variation of the angle or the attitude angle of a slider-mounting region 111b of a gimbal portion 111a with regard to the load beam (see FIGS. 9 and 10). Therefore, the thinner polyimide insulating layer and polyimide protection layer can stabilize the mechanical characteristics of the flexure.

On the other hand, when giving consideration to the electrical characteristics of the wiring structure, the thinner polyimide insulating layer is likely to be influenced by Eddy current flowing through the stainless-steel substrate, thereby disadvantageously increasing the resistance in the wiring structure. This increase in resistance of the wiring structure becomes more remarkable as the signal frequency becomes higher. The increase in the resistance of the wiring structure causes signals transmitting through the wiring structure to further decay, thereby hardly accomplishing a high-speed data transmission. In addition, the thinner polyimide insulating layer increases the capacitance between the wiring structure and the stainless-steel substrate. Such an increase in capacitance lowers the resonance frequency of a circuit system including a wiring structure and a magnetic head, where the length of the wiring structure is sufficiently short with regard to the signal wavelength. As a result, it is hard to read high-speed signals from and write the same to the magnetic disk.

Such increases in resistance and capacitance of the wiring structure accompanied by the thinner polyimide insulating layer can effectively be limited by selectively removing the portions of the stainless-steel substrate present below the wiring structure. Specifically, the capacitance in the wiring structure can be reduced by arranging opening portions below the wiring structure in the stainless-steel substrate. However, such opening portions greatly deteriorate the flexibility in mechanical designing of the flexure.

U.S. Pat. No. 5,739,982 discloses a flexure with the wiring conductor partly positioned sidewards of the stainless-steel substrate so as to limit the increase in resistance and capacitance of the wiring structure. This arrangement, however, poses a problem that the portion of the wiring conductor sidewards of the stainless-steel substrate is likely to be damaged or deformed by any other parts or matters, which are easily accessible to the wiring conductor sideways. As an additional problem in the flexure disclosed in the said U.S. patent publication, protrusions extending sidewards from the stainless-steel substrate for supporting the wiring conductor positioned sidewards of the stainless-steel substrate may deteriorate the flexibility in mechanical designing of the flexure.

The present invention has been conceived to solve these problems. It is an object of the invention to provide a wiring integrated flexure that is capable of avoiding deterioration of the flexibility in mechanical designing of the flexure, decreasing influences of the insulating layer over the mechanical characteristics of the flexure, and reducing resistance and capacitance of the wiring structure.

It is another object of the invention to provide a method of manufacturing such a wiring integrated flexure.

SUMMARY OF THE INVENTION

In accordance with the present invention, there is provided a wiring integrated flexure including a stainless-steel substrate for supporting a magnetic head slider thereon, a wiring conductor formed on the said stainless-steel substrate, posts made of a flexible resin and interposed between the stainless-steel substrate and the wiring conductor for electrically isolating the wiring conductor from the stainless-steel substrate, and the posts disposed along the lengthwise direction of the wiring conductor with spacing from each other.

The wiring integrated flexure of the above arrangement can achieve a reduction in capacitance in the wiring structure, prevention of the increase in resistance of the wiring structure in a high frequency signal region. In addition, the contacting area between the flexible resin and the stainless-steel substrate can be reduced so that the mechanical characteristics of the flexure is unlikely to be deteriorated, thereby providing an wiring integrated flexure having stabilized mechanical characteristics. Those effects are obtainable without defining openings in a region of the stainless-steel substrate below the wiring conductor, so that the flexibility in mechanical designing of the flexure is unlikely to be deteriorated. Further, the wiring conductor is not located sidewards of the stainless-steel substrate, but located within the stainless-steel substrate, so that any other parts or matters are unlikely to contact the wiring conductor from the lateral side or the lower side. Therefore, it is possible to effectively prevent the wiring conductor from being damaged or deformed.

The wiring integrated flexure preferably includes a base bottom layer made of a flexible resin and provided between each post and an adjacent post thereto of the posts in contact with a bottom surface of the wiring conductor and with spacing from the stainless-steel substrate.

The base bottom layer for supporting the wiring conductor in cooperation with the posts can achieve improved mechanical strength of the wiring conductor, resulting in improved reliability of the wiring structure.

The wiring conductor preferably has an outer surface covered with an Au layer.

The wiring conductor preferably has an outer surface covered with a protection layer made of a flexible resin.

The protection layer can achieve protection of the wiring conductor from the outside air, resulting in improved reliability of the wiring structure The wiring conductor preferably includes a protection pattern that is formed on the stainless-steel substrate extending along both the longitudinal sides of the stainless-steel substrate with the wiring conductor there between.

The protection pattern can reduce the load on the posts effected by a possible contact with any matters from above the flexure, and therefore preventing the wiring conductor from being damaged or deformed.

As another aspect of the invention, there is provided a method of manufacturing a wiring integrated flexure including a stainless-steel substrate for supporting a magnetic head slider thereon, a wiring conductor formed on the said stainless-steel substrate, posts made of polyimide and interposed between the stainless-steel substrate and the wiring conductor for electrically isolating the wiring conductor from the stainless-steel substrate, and the posts disposed along the lengthwise direction of the wiring conductor with spacing from each other, which includes:

a first step of applying a polyimide precursor onto the entire surface of the stainless-steel substrate;

a second step of curing the polyimide precursor by prebaking to form a polyimide precursor layer;

a third step of forming a wiring conductor pattern on the polyimide precursor layer;

a forth step of forming resists on regions of the polyimide precursor layer to be respectively formed into the posts, and the wiring conductor pattern;

a fifth step of etching out the polyimide precursor layer by using the resists as masks; and a sixth step of modifying the polyimide precursor layer left on the stainless-steel substrate into a polyimide layer by heat treatment.

The method of manufacturing a wiring integrated flexure further includes a step of forming an Ni/Au layer on the surface of the wiring conductor layer by electrolytic plating between the third step and the forth step, said third step including:

forming a build-up-forming conductive layer formed of a Cr layer on the entire surface of the polyimide precursor layer;

forming a plating resist on the build-up-forming conductive layer with the exception of a region thereof corresponding to the wiring conductor pattern;

forming an Au/Ni/Cu containing wiring conductor layer on the exposed surface of the build-up-forming conductive layer by electrolytic plating by using the plating resist as a mask;

removing the plating resist and the build-up-forming conductive layer with the exception of a region thereof, in which the wiring conductor layer has been formed; and As still another aspect of the invention, there is provided a method of manufacturing a wiring integrated flexure including a stainless-steel substrate for supporting a magnetic head thereon, a wiring conductor formed on the said stainless-steel substrate, posts made of polyimide and interposed between the stainless-steel substrate and the wiring conductor for electrically isolating the wiring conductor from the stainless-steel substrate, the posts disposed along the lengthwise direction of the wiring conductor with spacing from each other, and a base bottom layer made of polyimide and formed between each post and an adjacent post thereto of the posts in contact with a bottom surface of the wiring conductor and with spacing from the stainless-steel substrate, which includes:

a first step of applying a negative photosensitive polyimide onto the entire surface of the stainless-steel substrate;

a second step of curing the negative photosensitive polyimide by prebaking to form a photosensitive polyimide layer;

a third step of exposing the entire thickness of post forming regions of the negative photosensitive polyimide layer to light, the said post forming regions respectively corresponding to the posts;

a forth step of exposing only a surface side of a base-bottom-layer forming region of the photosensitive polyimide layer to light, the said base-bottom-layer forming region corresponding to the base bottom layer and including at least a region corresponding to the wiring conductor layer;

a fifth step of developing the photosensitive polyimide layer and subsequently subjecting the same to heat treatment so as to leave the entire thickness of the post forming regions of the photosensitive polyimide layer and the surface side of the base-bottom-layer forming region of the photosensitive polyimide layer located between adjacent posts of the posts, as a polyimide layer so as to form the posts and the base bottom layer;

a sixth step of forming a resist defining openings therein open to the posts and the base bottom layer;

a seventh step of depositing a Cr/Cu-containing build-up-forming conductive layer on the entire surface by sputtering, after forming the resist;

an eighth step of removing the resist so as to leave the build-up-forming conductive layer only on the posts and the base bottom layer;

a ninth step of forming a first plating resist defining an opening therein open to a region of the build-up-forming conductive layer, the said region corresponding to the wiring conductor;

a tenth step of forming a Cu-containing conductor layer on a region of the build-up-forming conductive layer exposed via the opening of the first plating resist, by electrolytic plating;

an eleventh step of removing the first plating resist and the build-up-forming conductive layer with the exception of the region thereof on which the Cu-containing conductor layer has been formed; and a twelfth step of forming a second plating resist on a region with the exception of the posts and the base bottom layer, and forming an Ni/Au layer on the Cu-containing conductor layer by electrolytic plating.

As another aspect of the invention, there is provided a method of manufacturing a wiring integrated flexure including a stainless-steel substrate for supporting a magnetic head thereon, a wiring conductor formed on the said stainless-steel substrate, a protection layer made of polyimide and covering the surface of the said wiring conductor, posts made of polyimide and interposed between the stainless-steel substrate and the wiring conductor for electrically isolating the wiring conductor from the stainless-steel substrate, the posts disposed along the lengthwise direction of the wiring conductor with spacing from each other, and a base bottom layer made of polyimide and formed between each post and an adjacent post thereto of the posts in contact with a bottom surface of the wiring conductor and with spacing from the stainless-steel substrate, which comprises:

a first step of forming on the stainless-steel substrate a first resist with openings therein respectively open to post-forming regions, the said post-forming regions respectively corresponding to the posts;

a second step of applying a polyimide precursor on the entire surface of the first resist and regions of the stainless-steel substrate exposed via the openings, and forming a first polyimide precursor layer by prebaking;

a third step of forming a second resist on post forming regions and a base-bottom-layer forming region of the polyimide precursor, the post forming regions respectively corresponding to the posts, and the base-bottom-layer forming region corresponding to the base bottom layer;

a fourth step of etching out the exposed portion of the polyimide precursor layer by using the second resist as a mask;

a fifth step of etching out the second resist and depositing a build-up-forming conductive layer entirely on the first polyimide precursor layer left on the stainless-steel substrate and the exposed surface of the first resist by sputtering;

a sixth step of forming a plating resist on the build-up-forming conductive layer with the exception of a region thereof corresponding to the wiring conductor;

a seventh step of forming a wiring conductor layer on the exposed surface of the build-up-forming conductive layer by electrolytic plating by using the plating resist as a mask;

an eighth step of removing the plating resist and etching out the exposed portion of the build-up-forming conductive layer by using the wiring conductor layer as a mask;

a ninth step of applying a polyimide precursor entirely on the exposed surface of the first resist, the exposed surface of the first polyimide precursor and the wiring conductor layer in such a manner as to cover the wiring conductor layer, and forming a second polyimide precursor layer by prebaking;

a tenth step of forming a third resist on a region of the second polyimide precursor layer, the said region corresponding to the posts and the base bottom layer;

an eleventh step of etching out the exposed portion of the second polyimide precursor layer by using the third resist as a mask, and leaving only a portion of the second polyimide precursor layer, the said portion covering the wiring conductor; and a twelfth step of removing the first resist and the third resist, and subjecting the first polyimide precursor layer and the second polyimide precursor layer left on the stainless-steel substrate to heat treatment to modify the first polyimide precursor layer and the second polyimide precursor layer respectively into polyimide layers so as to form the posts, the base bottom layer and the protection layer.

BRIEF DESCRIPTION OF THE DRAWING

The above, and other objects, features and advantages of the present invention will become apparent from the detailed description thereof in conjunction with the accompanying drawings wherein:

FIG. 8(a) is a longitudinal cross section of the wiring integrated flexure according to a fourth embodiment of the present invention.

FIG. 8(b) is a longitudinal cross section of another example of the wiring integrated flexure as illustrated in FIG. 8(a).

DETAILED DESCRIPTION OF THE PREFERRED EMBODIMENT

Embodiment 1

A first embodiment of a wiring integrated flexure according to the present invention will be hereinafter described with reference to the accompanying drawings.

Figure 1:
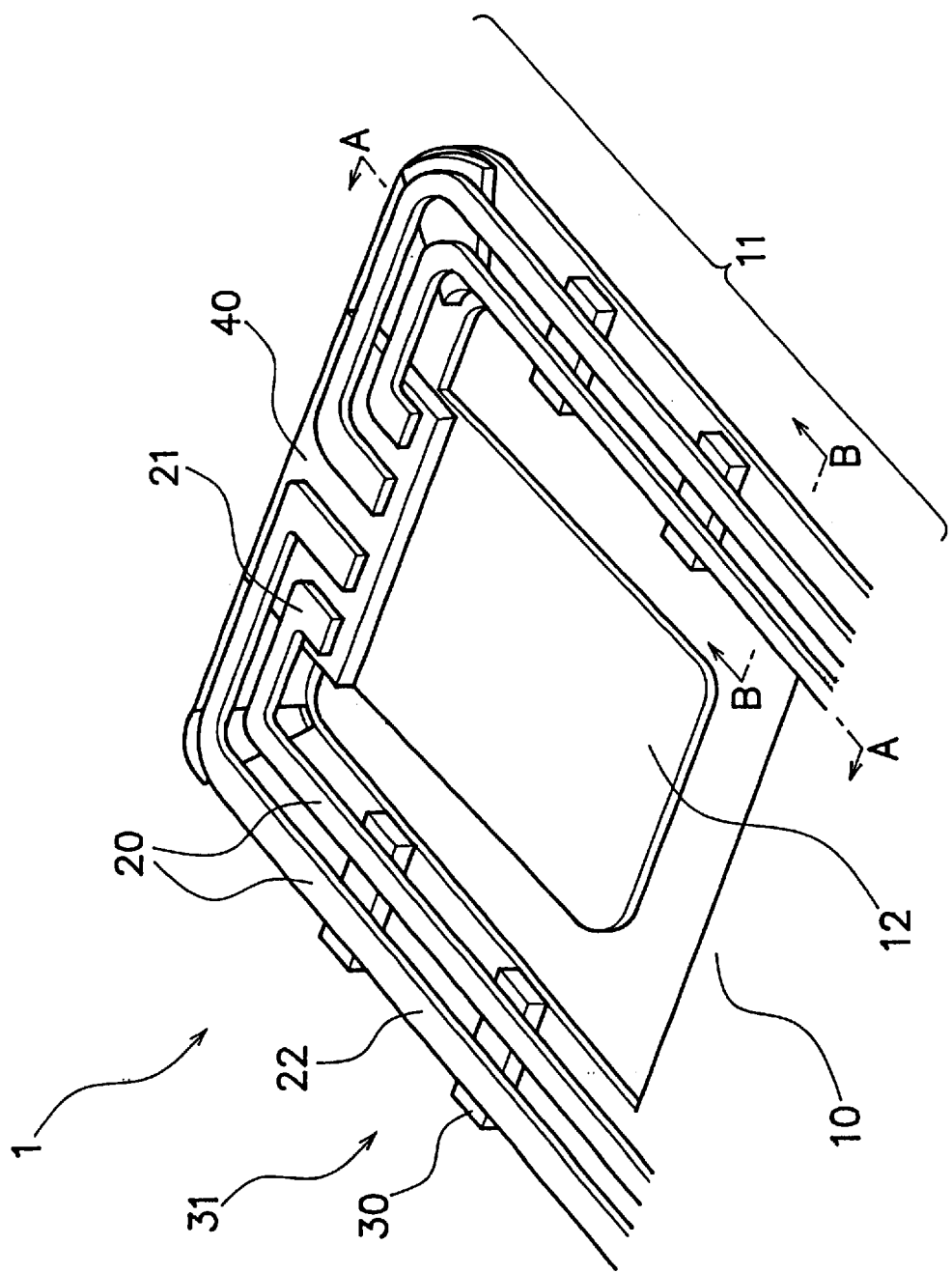
FIG. 1 is a perspective view of a distal end portion of a wiring integrated flexure according to a first embodiment of the present invention.
Figure 2A:
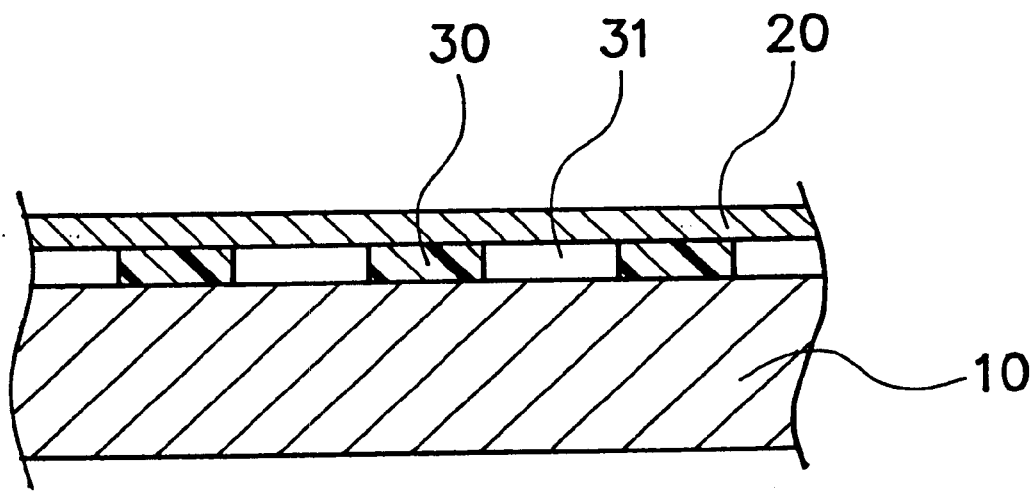
FIGS. 2(a) and 2(b) are cross sections respectively taken along the lines A—A and B—B in FIG. 1.
Figure 2B:
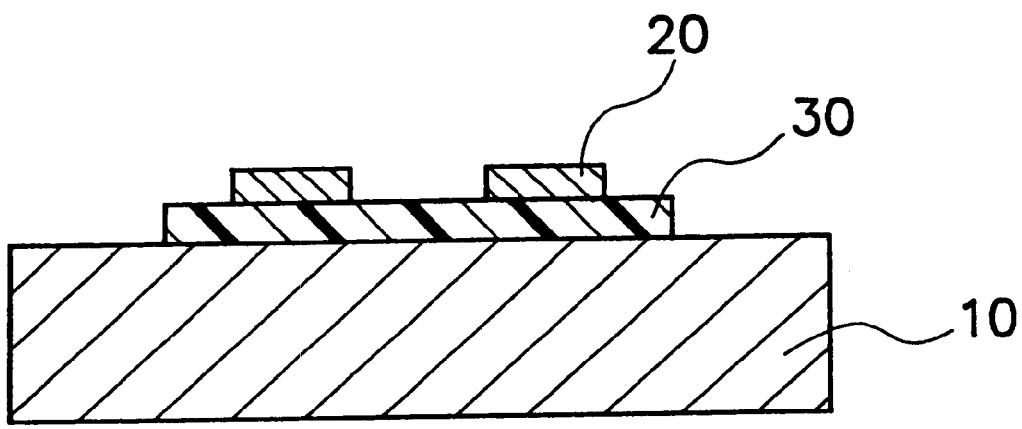

FIG. 1 is a perspective view of a distal end portion of the wiring integrated flexure 1 according to this embodiment. FIGS. 2(a) and 2(b) are cross sections respectively taken along the lines A—A and B—B in FIG. 1. As illustrated in these figures, the wiring integrated flexure 1 is provided with a stainless-steel substrate 10 including at the distal end thereof a gimbal portion 11 with a magnetic-head-slider mounting portion 12 thereon, and a wiring conductor 20 integrally formed on the said stainless-steel substrate 10.

The wiring conductor 20 includes a distally positioned terminal pad 21 closer to the slider and a proximally positioned terminal pad (not illustrated) closer to a base plate, and a signal line portion 22 between the said terminal pads.

The wiring integrated flexure 1 includes posts 30 in the signal line portion 22 of the wiring conductor 20, which posts are interposed between the stainlesssteel substrate 10 and the wiring conductor 20 for supporting the wiring conductor in such a manner as to electrically isolate the wiring conductor from the stainless-steel substrate. The said posts may be made of a flexible resin such as polyimide, liquid crystal polymer or polyester.

The posts 30 are disposed along the lengthwise direction of the wiring conductor with spacing from each other in the signal line portion so as to form clearances 31 in which only the air exists, so that the capacitance between the wiring conductor 20 and the stainless steel substrate 10 in the signal line portion can greatly be reduced. The reason for this will be hereinafter explained by taking for example the case that polyimide is used as the flexible resin.

While the dielectric constant of polyimide is approximately in the range of from 3.0 to 3.5, that of the air is approximately 1.0. Accordingly, in comparison with a conventional wiring integrated flexure with a polyimide insulating layer entirely disposed between the wiring conductor and the stainless-steel substrate, the capacitance between the wiring conductor 20 and the stainless-steel substrate 10 in a portion where the clearances 31 exist is one third or less of the capacitance in a wiring structure of the conventional wiring integrated flexure. Such a reduction in capacitance between the wiring conductor 20 and the stainless-steel substrate 10 provides improved reliability in writing and reading operation of high frequency signals.

Insulating layers 40 made of a flexible resin are preferably provided entirely below the terminal pad 21 closer to the slider and the terminal pad (not illustrated) closer to the base plate of the wiring conductor 20 so as to render the terminal pads tolerable against the load which is applied during connecting operation between the terminal pads, and the magnetic head slider or an FPC.

The posts 30 each preferably have a length of 40 to 100 $\mu$m along the lengthwise direction of the wiring conductor 20, and a length of 120 to 200 $\mu$m along the transverse direction to the lengthwise direction of the wiring conductor 20, although the latter length is varied according to the width of a wire, the space between adjacent wires, etc., of the wiring structure. The distance between adjacent posts, or the length of each clearance 31 is preferably 100 to 200 $\mu$m.

The height or thickness of each post 30 and the thickness of the insulating layer 40 is preferably thicker than the thickness of a conventional polyimide insulating layer, and more preferably set to 15 to 30 $\mu$m. Thickening the posts 30 and the insulating layer 40 can further reduce the capacitance between the wiring conductor 20 and the stainless-steel substrate 10. In this embodiment, the contacting area between the stainless-steel substrate and a flexible resin is limited to the contacting area between the posts 30 and the stainless-steel substrate 10, so that the mechanical characteristics of the stainless-steel substrate 10 are unlikely to be damaged by the thicker posts 30 and insulating layer 40.

The wiring conductor 20 preferably includes a laminated member formed of Cr/Au/Ni/Cu (thicknesses: 0.1 $\mu$m; 1 $\mu$m; 1 $\mu$m; and 5 to 15 $\mu$m, respectively) with an upper surface and a side surface of the laminated member covered with a cover layer, so as to prevent the corrosion of the laminated member. The said cover layer may be, for example, Ni/Au (thicknesses: 1 $\mu$m; and 1 $\mu$m, respectively). The stainless-steel substrate 10 may be formed of for example, a rolled stainless-steel material such as SUS304 having a thickness of approximately 20 to 30 $\mu$m.

A method of manufacturing the wiring integrated flexure according to this embodiment will be hereinafter described by taking for example the case that the posts are made of polyimide. FIGS. 3(a) to 3(e) respectively illustrate steps of manufacturing the wiring integrated flexure 1.

A polyimide precursor 35 is, first, applied onto the stainless-steel substrate 10 having a predetermined thickness, and then cured by prebaking to form a polyimide precursor layer 35. The prebaking may be performed at a temperature of, for example, 100 to 200. degree. C.

Next, a build-up-forming conductive layer (not illustrated) is formed on the entire surface of the polyimide precursor layer 35, and then a plating resist (not illustrated) is formed on the build-up-forming conductive layer with the exception of a region thereof corresponding to a wiring conductor pattern. The build-up-forming conductive layer may be a Cr layer having a thickness of approximately 0.1 mm, and formed by sputtering.

The wiring conductor 20 is, then, formed on the exposed portion of the build-up-forming conductive layer. The said wiring conductor may be made of for example, Au/Ni/Cu (thicknesses: 1 $\mu$m; 1 $\mu$m; and 5 to 15 $\mu$m, respectively), and formed by electrolytic plating. The plating resist is then removed, and the build-up-forming conductive layer with the exception of a region thereof directly below the wiring conductor 20 is etched out by using the wiring conductor as a mask (FIG. 3(a)). A cover layer (not illustrated) is, then, formed on the surface of the wiring conductor. The said cover layer may be an Ni/Au layer (thicknesses: 1 $\mu$m; and 1 $\mu$m, respectively) and formed by electrolytic plating.

Figure 3A:
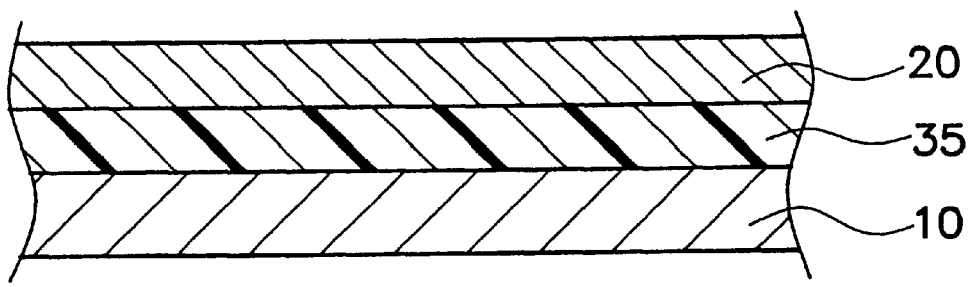
FIGS. 3(a) to 3(e) respectively illustrate steps of manufacturing the wiring integrated flexure of FIG. 1.
Figure 3B:
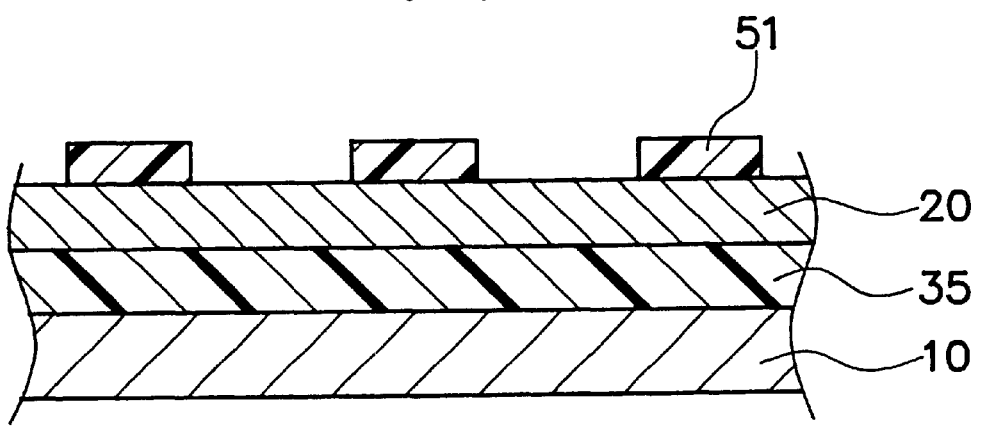
Figure 3C:
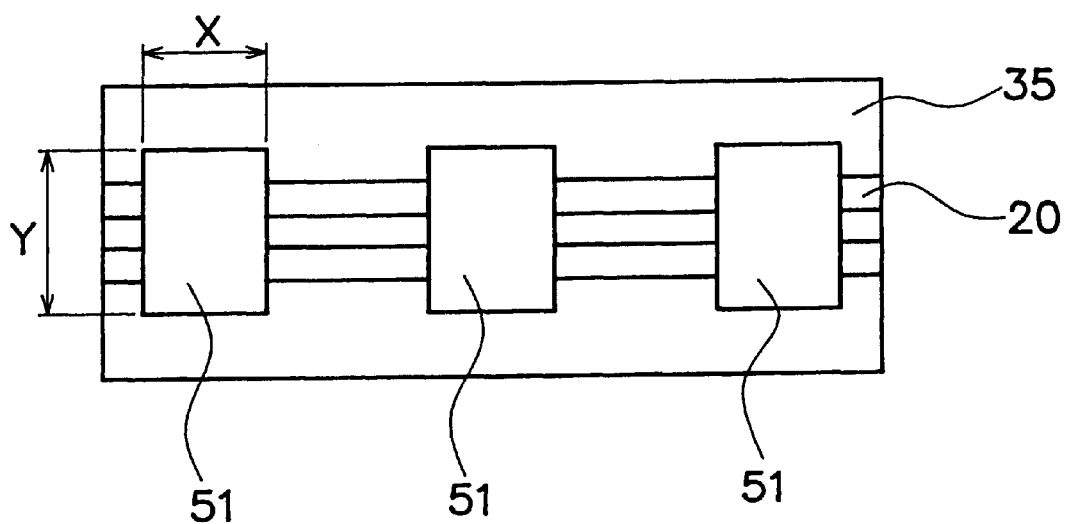

Next, resists 51 are respectively formed on regions of the polyimide precursor layer 35, which regions respectively correspond to the posts 30, and portions surrounding the posts. FIGS. 3(b) and 3(c) are respectively a cross section and a plan view illustrating this state.

Figure 3D:
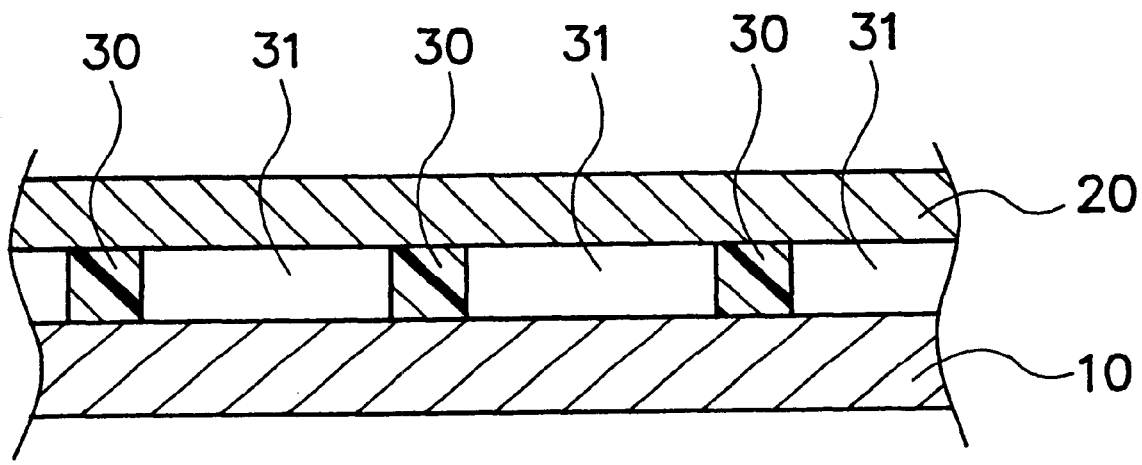
Figure 3E:
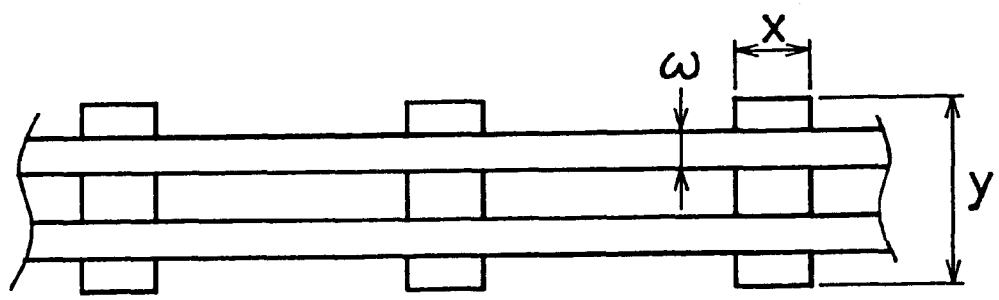

The polyimide precursor layer 35 is, then, etched out with an alkaline solution such as KOH, Tri-methyl-ammonium-hydride (TMAH) by using the said resists 51 as masks, thereby leaving only the portions of the polyimide precursor layer 35 corresponding to the posts 30. FIGS. 3(d) and 3(e) are respectively a cross section and a plan view illustrating this state. The etching of the polyimide precursor layer 35 with the alkaline solution progresses not only in the vertical direction, but also in the horizontal direction, so that the polyimide precursor layer below the wiring conductor is removed. On the other hand, the polyimide precursor layer 35 below the resists 51 is also removed to some extent. In consideration of this, the size or plane area of each resist 51 is adjusted so as to allow the polyimide precursor layer 35 to leave its portions each having a preferable size and shape for a corresponding post. Specifically, only the post forming portions of the polyimide precursor layer can effectively be left by adjusting the plane area of each resist 51 to the size larger than the plane area of a corresponding post 30. The plane area of each resist X μm X Y μm can be represented, for example, as: X mm X Y mm=(x+w)mm X (y+w)mm, in which x mm X y mm is the plane area of each post to be left, and w μm is the width of the wiring conductor (see FIGS. 3(c) and 3(e)).

The resists are, then, removed, and the polyimide precursor 35 is modified into polyimide by heat treatment. The said heat treatment may be performed, for example, at a temperature of 350 to 400.degree. C.

The stainless-steel substrate 10 is, then, subjected to a forming operation so as to obtain the wiring integrated flexure 1 according to this embodiment. The said forming operation may be accomplished, for example, by forming resists on the entire surface of the front side of the stainless-steel substrate, and predetermined regions of the rear side of the stainless-steel substrate to be left, and etching the substrate with an etching solution by using these resists as masks. The said etching solution may be, for example, a ferric-chloride-containing solution.

The thus formed wiring integrated flexure includes the posts 30 located along the lengthwise direction of the wiring conductor 20 with the clearances 31 so as to support the wiring conductor 20, and allow only the air to exist between the wiring conductor 20 and the stainless-steel substrate 10, thereby achieving simultaneously a large decrease in capacitance between the wiring conductor 20 and the stainless-steel substrate 10 in the region except for the posts 30, and a reduced influence of the flexible resin constituting the insulating layer over the mechanical characteristics of the stainless-steel substrate 10, particularly the attitude angle of the slider-mounting portion 12, as well as a limited influence of Eddy current flowing through the stainless-steel substrate 10 for preventing the increase in resistance of the wiring conductor in a high frequency signal region.

The wiring integrated flexure of this embodiment largely reduces the contacting area between the stainless-steel substrate and the flexible resin as compared with the wiring integrated flexure of the conventional type, so that thicker posts, and thicker insulating layer are unlikely to deteriorate the mechanical characteristics of the stainless-steel substrate 10. Therefore, it is possible to employ such thicker posts, and thicker insulating layer as compared with those of the conventional type, thereby more effectively achieving a reduction in capacitance between the wiring conductor 20 and the stainless-steel substrate 10, and a limited influence of Eddy current flowing through the stainless-steel substrate 10 over the wiring conductor 20.

The wiring integrated flexure of this embodiment can achieve the prevention of the reduction m capacitance of the wiring structure and the increase in resistance of the wiring structure without defining opening portions in the stainless-steel substrate below the wiring conductor, so that the flexibility in mechanical designing of the flexure is unlikely to be deteriorated.

The wiring conductor 20 is not located sidewards of the stainless-steel substrate, but located within the stainless-steel substrate 10 as viewed from the top, so that any other parts or matters are unlikely to contact the wiring conductor from the lateral side or the lower side. Therefore, it is possible to effectively prevent the wiring conductor 20 from being damaged or deformed. The cover layer covering the surface of the wiring conductor can prevent corrosion of the Cu layer in the wiring conductor.

Embodiment 2

A second embodiment of a wiring integrated flexure according to the present invention will be hereinafter described with reference to the accompanying drawings.

Figure 4A:
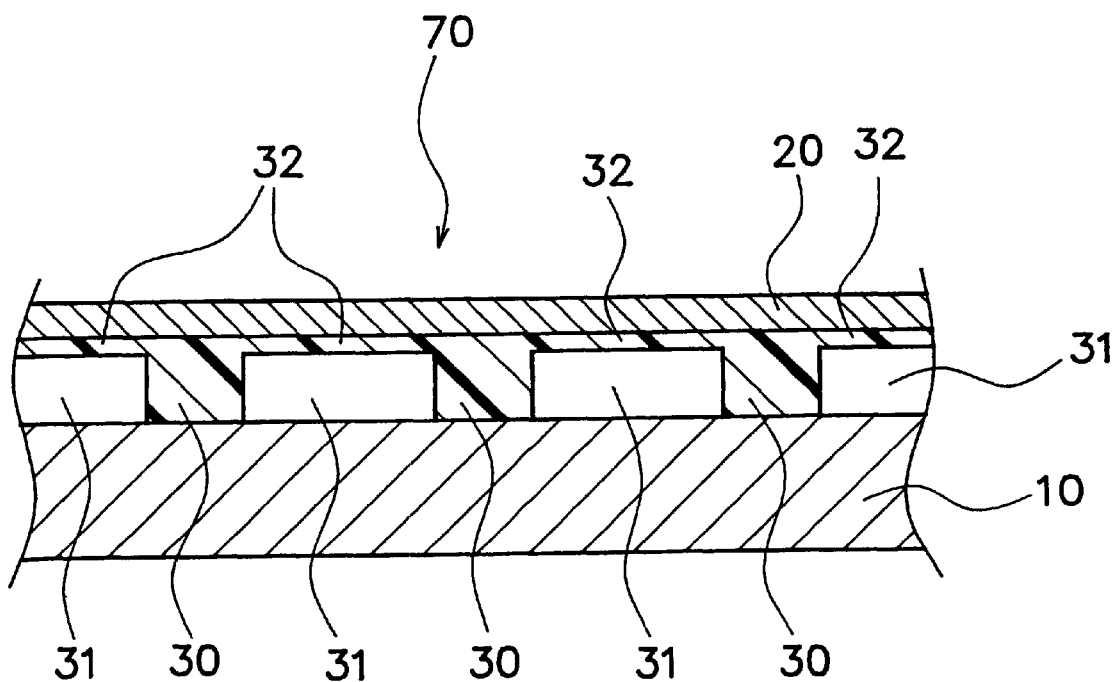
FIGS. 4(a) and 4(b) are respectively a lateral cross section and a longitudinal cross section of the wiring integrated flexure according to a second embodiment of the present invention.
Figure 4B:
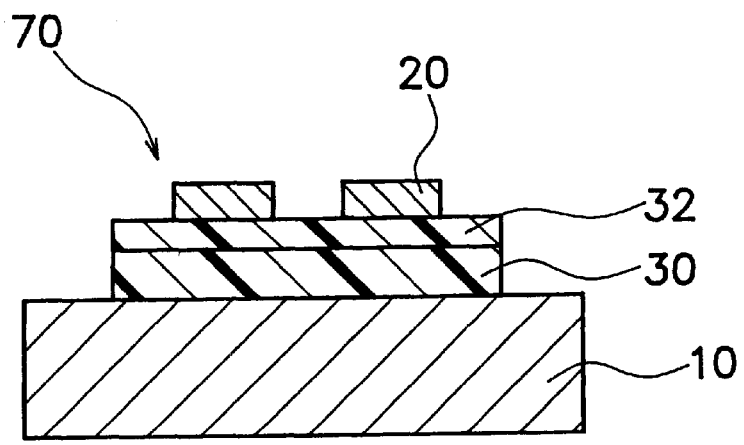

FIGS. 4(a) and 4(b) are respectively a lateral cross section and a longitudinal cross section of the signal line portion 22 of a wiring integrated flexure 70 according to this embodiment, which figures respectively correspond to FIGS. 2(a) and 2(b) in the first embodiment. Hereinafter, corresponding or identical parts to those of the first embodiment have been given the same reference characters to omit a detailed description thereof.

As illustrated in FIGS. 4(a) and 4(b), the wiring integrated flexure 70 of this embodiment includes a base bottom layer 32 that extends between each post 30 and an adjacent post 30 thereto in contact with a bottom surface of the wiring conductor 20 and with spacing from the stainless-steel substrate 10 so as to support the wiring conductor 20 in cooperation with the posts 30. The base bottom layer 32 may be formed from a flexible resin, and is preferably the same material as the posts 30. The said base bottom layer preferably has a thickness of 3 to 5 μm.

A method of manufacturing the wiring integrated flexure according to this embodiment will be hereinafter described with reference to the accompanying drawings by taking for example the case that the posts 30 and the base bottom layer 32 are formed from polyimide. FIGS. 5(a) to 5(g) respectively illustrate the steps of manufacturing the wiring integrated flexure.

A negative photosensitive polyimide 36 is applied on the entire surface of the stainless-steel substrate 10, and is subjected to a prebaking treatment so as to form a photosensitive polyimide layer 36. The entire thickness of post-forming regions 30' of the photosensitive polyimide layer 36 is, then, exposed to light 52 with a stronger luminous intensity. Only a surface side of a base-bottom-layer forming region of the photosensitive polyimide layer, which extends over a wiring conductor forming region and therefore is slightly larger than the said wiring conductor forming region, is exposed to light 53 with a weaker luminous intensity (FIG. 5(a)).

The photosensitive polyimide layer 36 is, then, developed to leave the portions corresponding to the posts and the base bottom layer. Thereafter, a curing treatment is performed to form the posts 30 and the base bottom layer 32 (FIG. 5(b)). The said curing treatment is performed, for example, at a temperature of 350 to 400.degree. C.

Figure 5A:
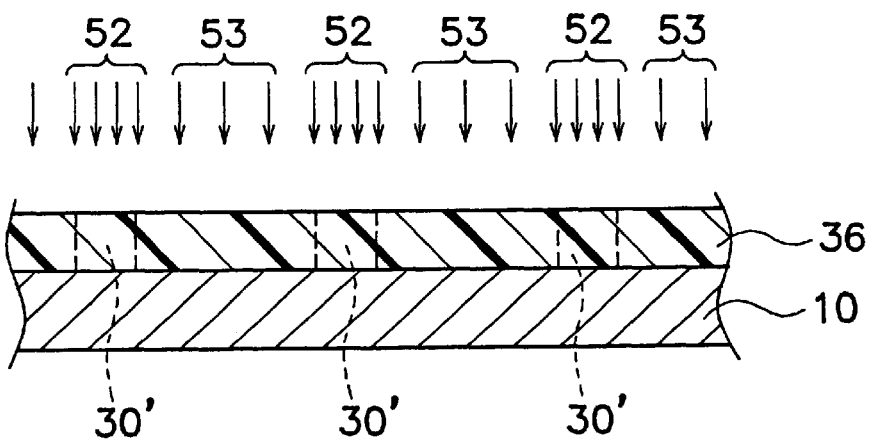
FIGS. 5(a) to 5(g) respectively illustrate steps of manufacturing the wiring integrated flexure of FIGS. 4(a) and 4(b).
Figure 5B:
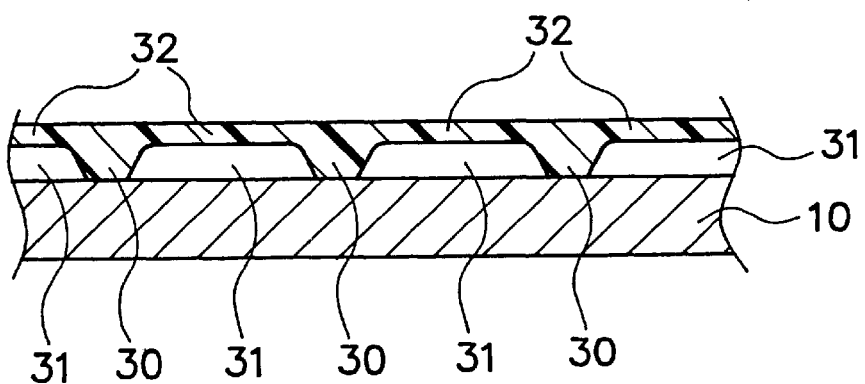
Figure 5C:
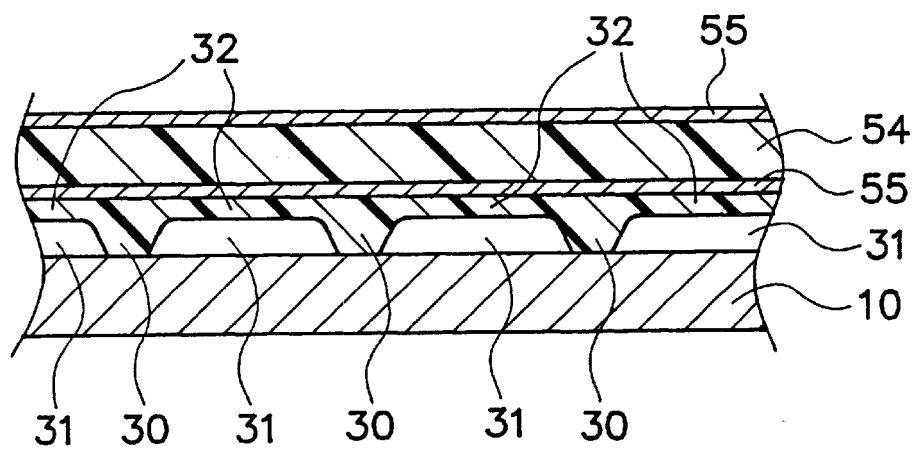
Figure 5D:
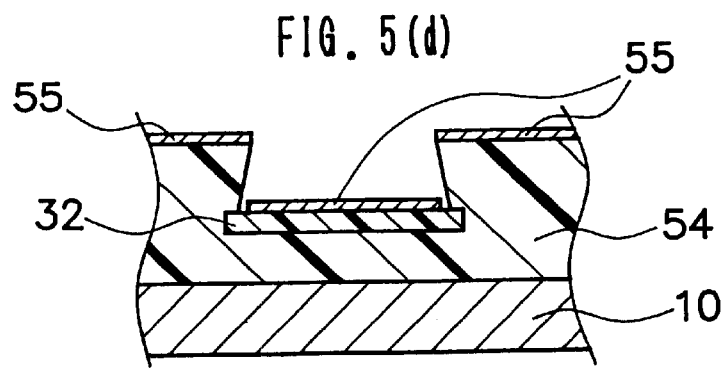

A resist 54 is formed with openings therein open only to the posts 30 and the base bottom layer 32, and a build-up-forming conductive layer 55 is deposited on the entire surface of the said resist. FIGS. 5(c) and 5(d) are respectively cross sections taken along the lengthwise direction of the wiring structure and the transverse direction to the lengthwise direction of the wiring structure in such a state. The resist 54 is, then, removed to leave the build-up-forming conductive layer 54 only above the posts 30 and the base bottom layer 32. The build-up-forming conductive layer 55 may be a Cr/Cu layer (thicknesses: 0.1 μm; and 0.1 μm, respectively).

Figure 5E:
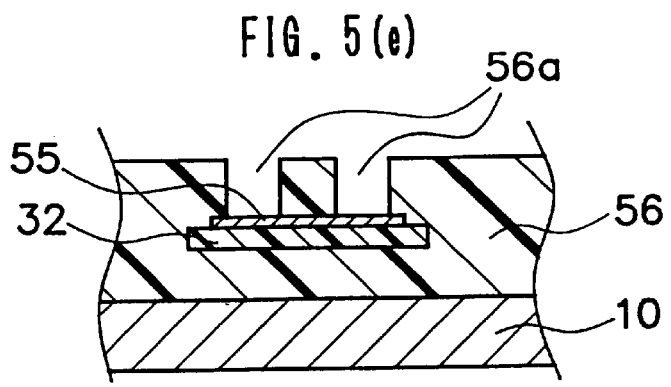
Figure 5F:
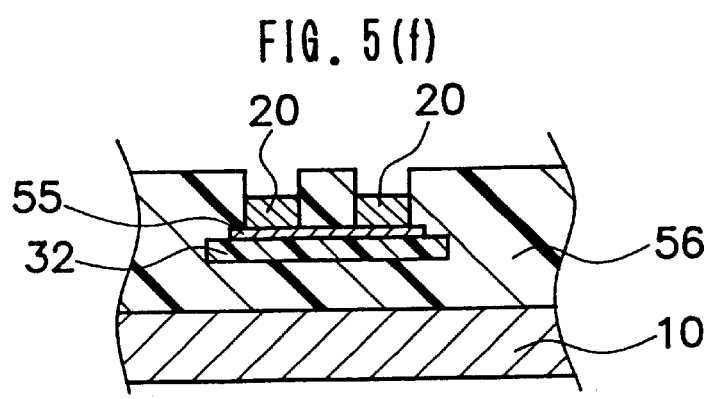
Figure 5G:
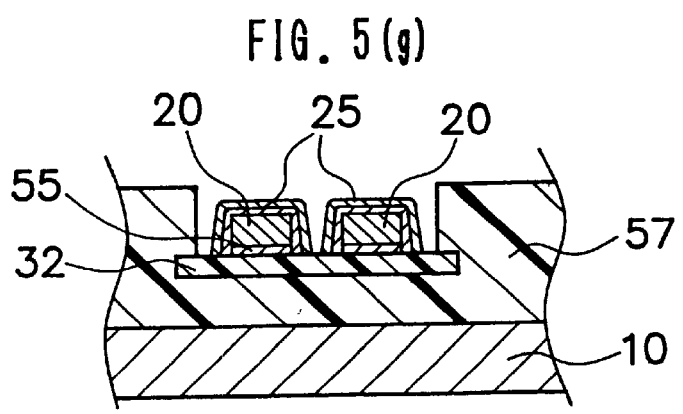

A first plating resist 56 is formed as defining therein an opening 56a open only to a region corresponding to the wiring conductor on the build-up-forming conductive layer 55, as illustrated in FIG. 5(e). The wiring conductor 20 is, then, formed on a region of the build-up-forming conductive layer 55 exposed via the opening 56a, as illustrated in FIG.

5(*f*). The said wiring conductor 20 may be, for example, a Cu layer having a thickness of 5 to 15 $\mu$m formed by electrolytic plating. The first plating resist 56 is then removed and the build-up-forming conductive layer 55 with the exception of a region thereof directly below the wiring conductor is etched out by using the wiring conductor 20 as a mask.

Next, a cover layer 25 is formed to cover the wiring conductor 20. The said cover layer 25 may be, for example, an Ni/Au layer (thicknesses: 1 $\mu$m; and 1 $\mu$m, respectively) which is formed by electrolytic plating, after forming a second plating resist 57 on the stainless-steel substrate with the exception of regions corresponding to posts 30 and the base bottom layer 32, as illustrated in FIG. 5(*g*). The second plating resist 57 is removed after forming the cover layer 25.

The stainless-steel substrate 10 is then subjected to a forming operation so as to obtain the wiring integrated flexure 70 of this embodiment. The said forming operation may be accomplished, for example, by forming resists on the entire surface of the front side of the stainless-steel substrate, and predetermined regions of the rear side of the stainless-steel substrate to be left, and etching the substrate with an etching solution by using these resists as masks. The said etching solution may be, for example, a ferric-chloride-containing solution.

The thus formed wiring integrated flexure 70 includes the base bottom layer 32 for supporting the wiring conductor 20 in cooperation with the posts 30, thereby achieving improved mechanical strength of the wiring conductor 20, in addition to the effects in the first embodiment. The base bottom layer 32 is out of contact with the stainless-steel substrate 10, so as not to deteriorate the mechanical characteristics of the stainless-steel substrate 10.

The wiring integrated flexure of this embodiment includes the wiring conductor 20 with its bottom surface entirely covered with the posts 30 and the base bottom layer 32, so that the bottom side of the wiring conductor 20 can be protected against corrosion.

Embodiment 3

A third embodiment of a wiring integrated flexure according to the present invention will be hereinafter described with reference to the accompanying drawings.

Figure 6A:
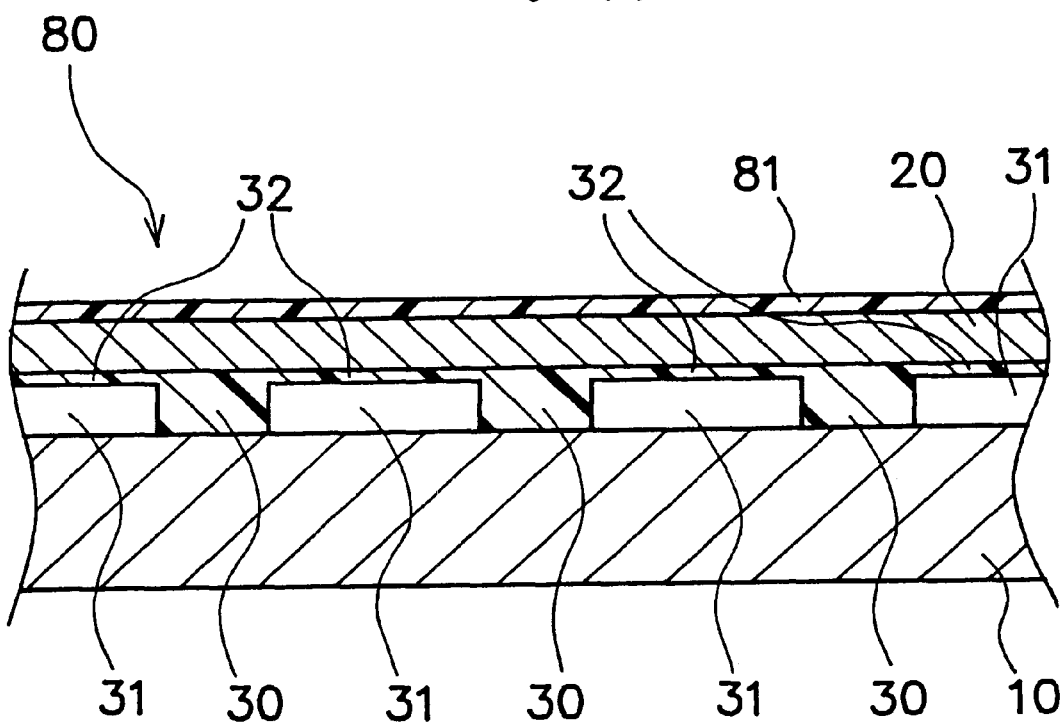
FIGS. 6(a) and 6(b) are respectively a lateral cross section and a longitudinal cross section of the wiring integrated flexure according to a third embodiment of the present invention.
Figure 6B:
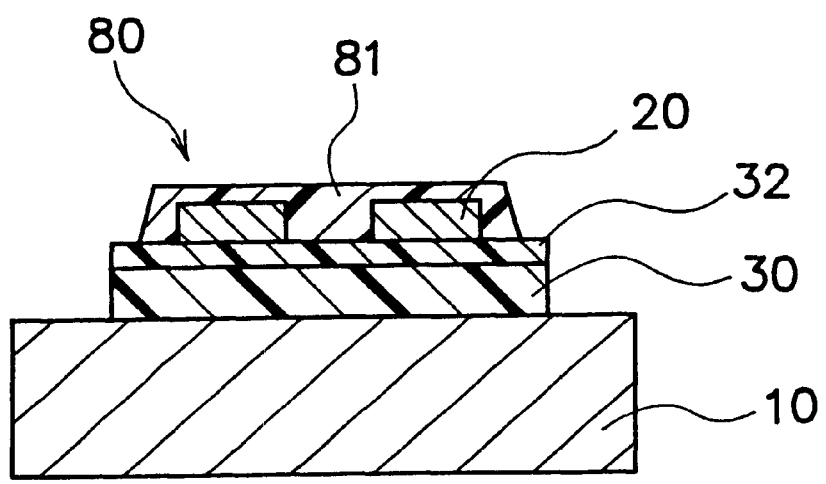
Figure 7A:
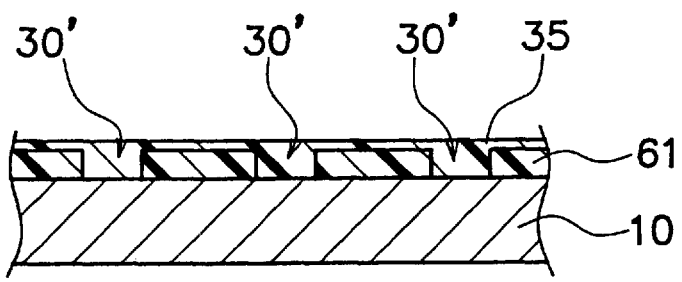
FIGS. 7(a) to 7(f) respectively illustrate steps of manufacturing the wiring integrated flexure of FIGS. 6(a) and 6(b).
Figure 7B:
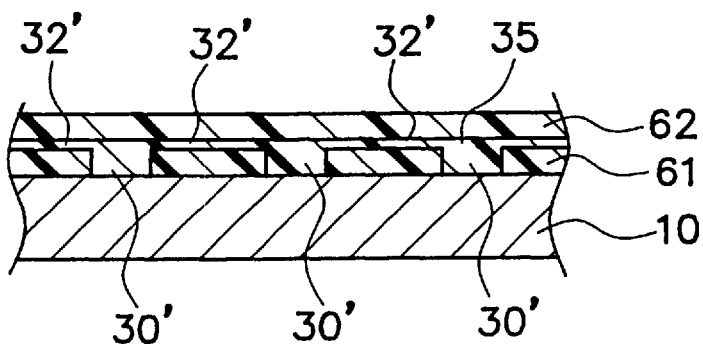
Figure 7C:
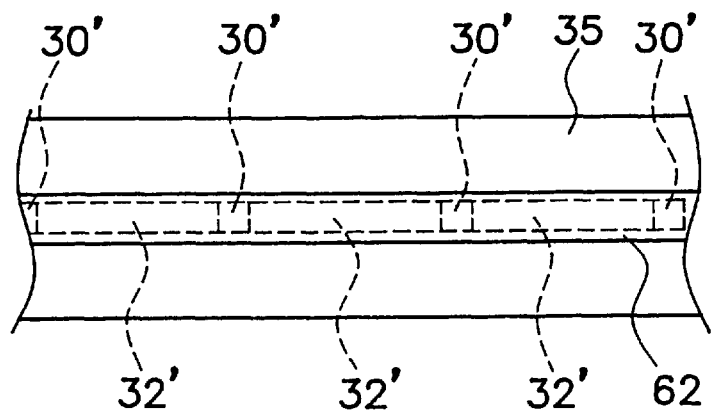
Figure 7D:
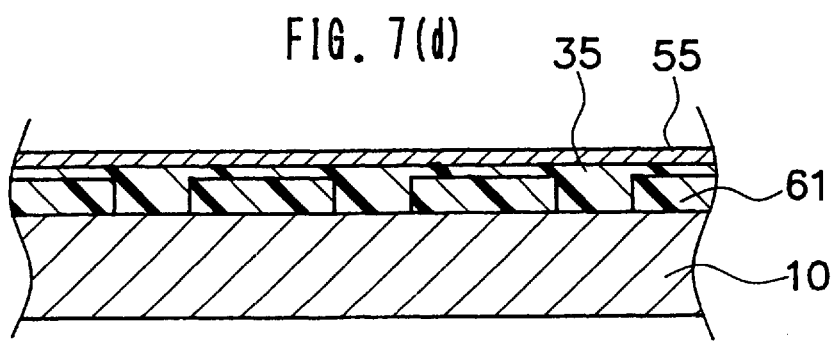
Figure 7E:
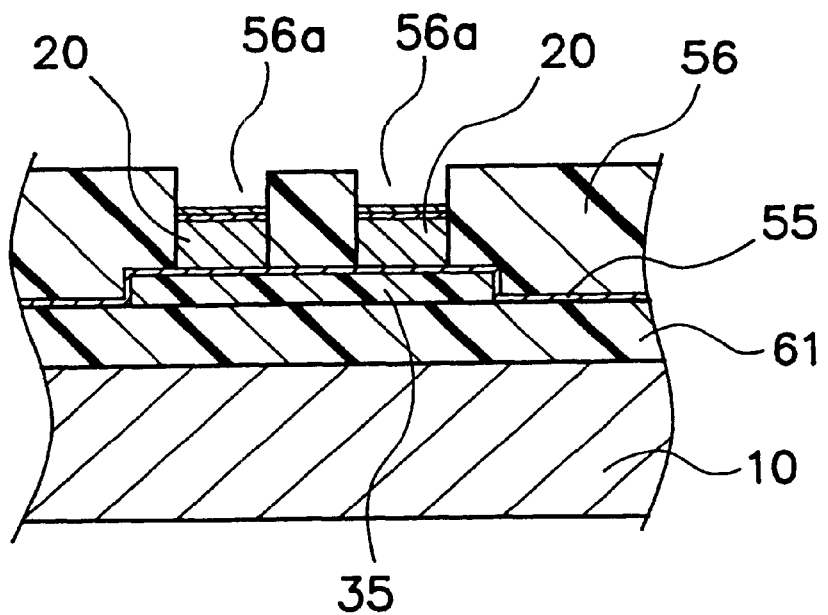
Figure 7F:
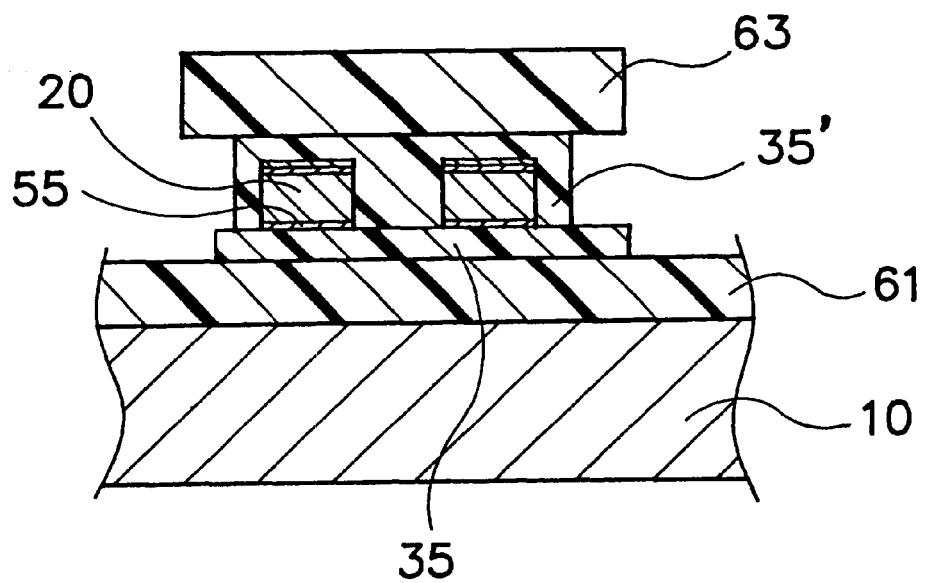
Figure 9:
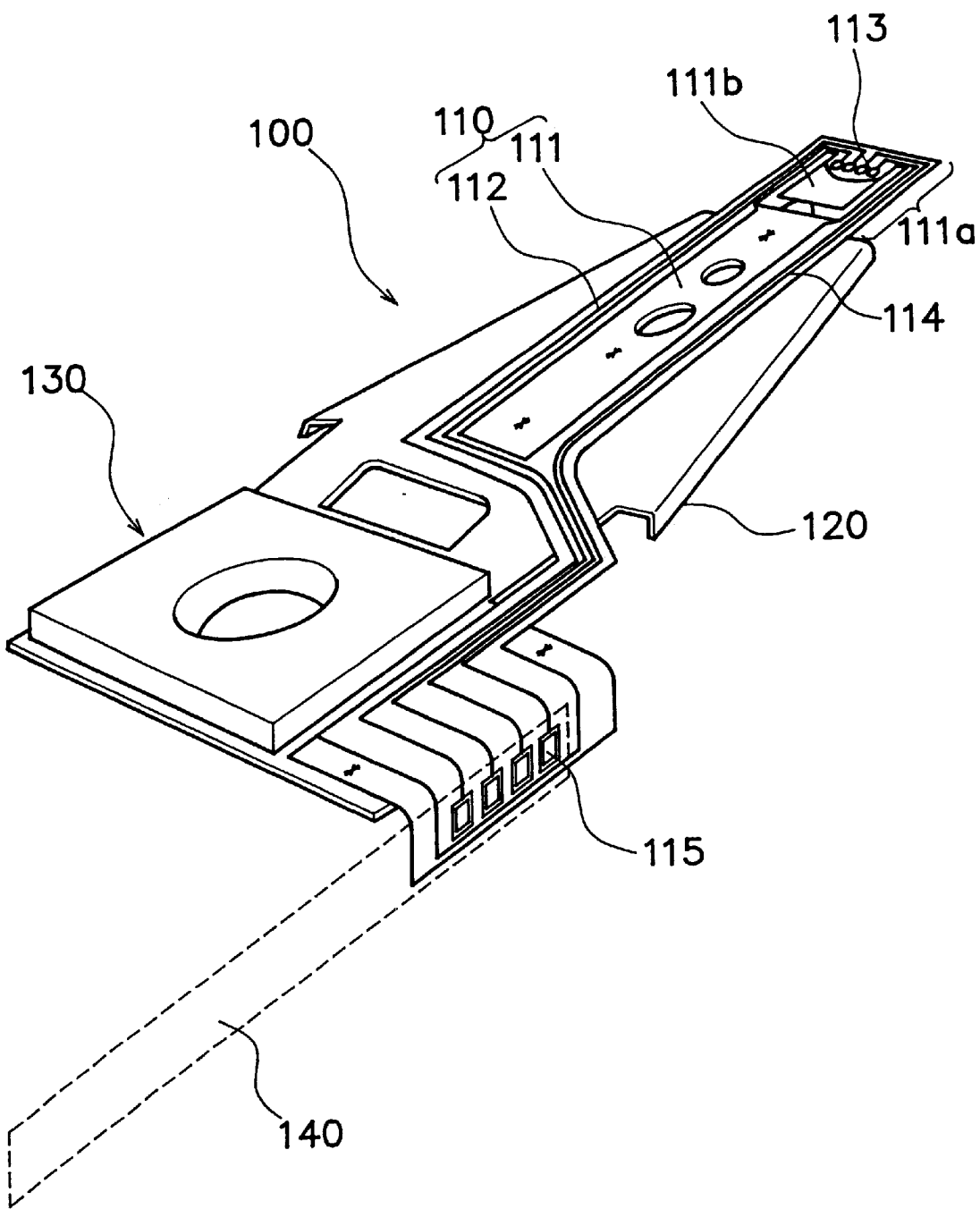
FIG. 9 is a perspective view of a conventional magnetic head suspension.
Figure 10:
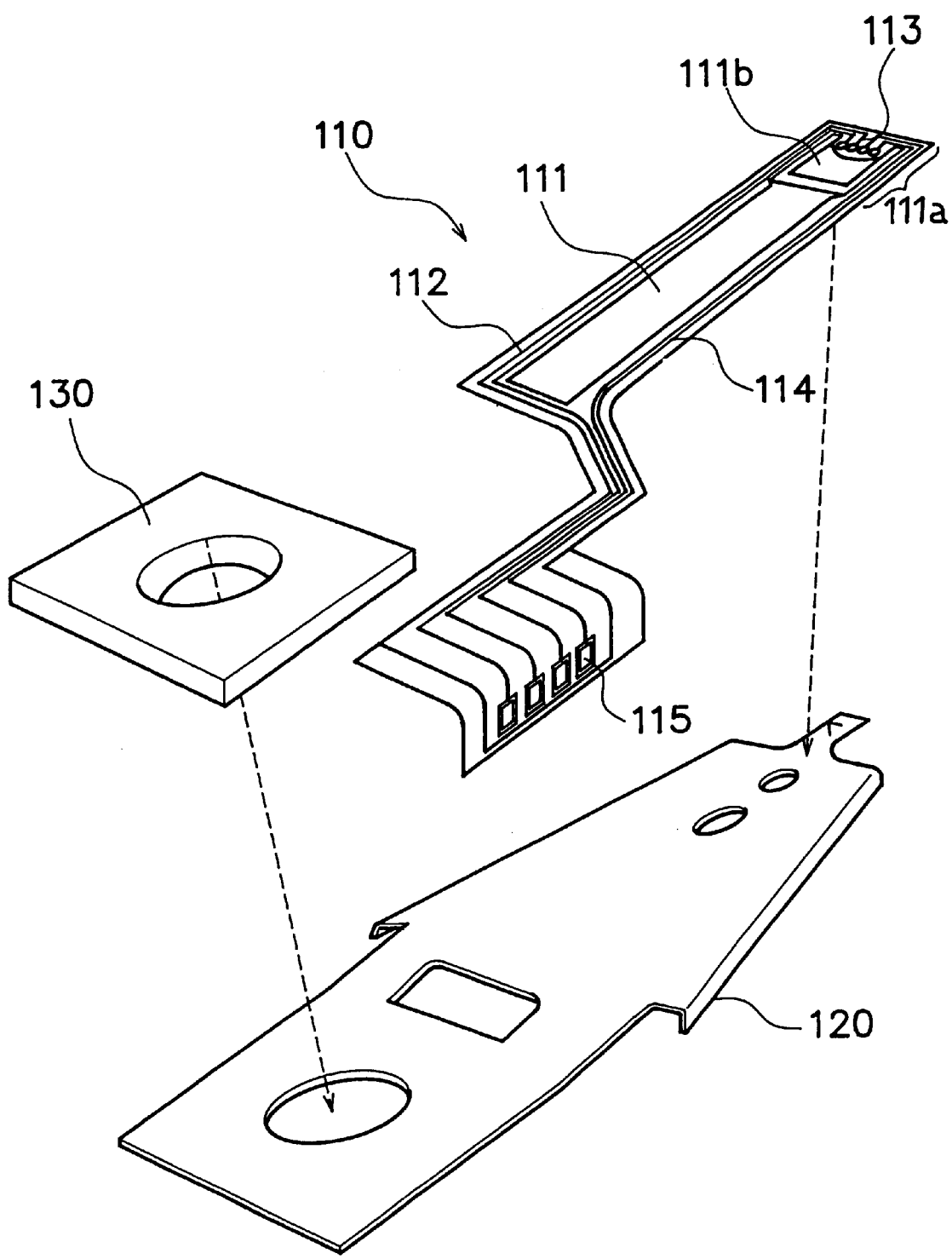
FIG. 10 is an exploded perspective view of the conventional magnetic head suspension as illustrated in FIG. 9.
Figure 11A:
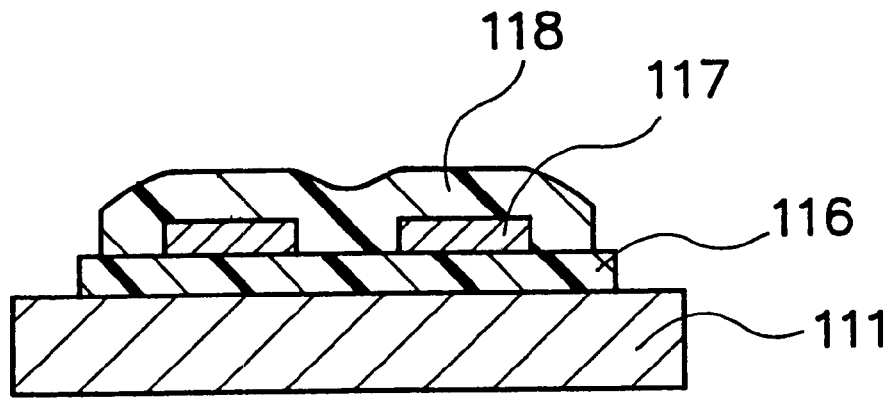
FIGS. 11(a) and 11(b) are respectively longitudinal cross sections of a signal line portion and a terminal pad portion in a wiring integrated suspension of a general type.
Figure 11B:
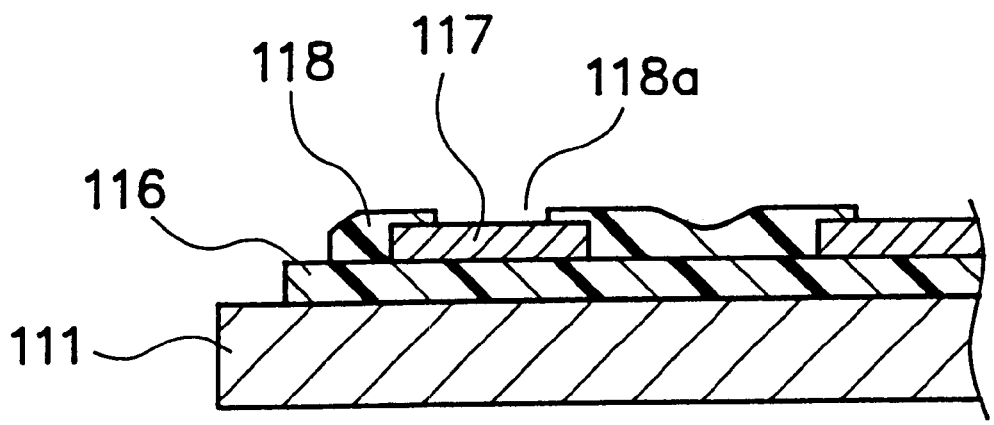

FIGS. 6(*a*) and 6(*b*) are respectively a lateral cross section and a longitudinal cross section of the signal line portion of a wiring integrated flexure 80 according to this embodiment, which figures respectively correspond to FIGS. 3(*a*) and 3(*b*) in the second embodiment. Hereinafter, corresponding or identical parts to those of the first or second embodiments have been given the same reference characters to omit a detailed description thereof.

As illustrated in FIGS. 6(*a*) and 6(*b*), the wiring integrated flexure 80 of this embodiment includes a protection layer 81 for covering the wiring conductor 20 of the flexure having the arrangement described in the second embodiment. The protection layer 81 may be a polyimide layer having a thickness of 1 to 3 $\mu$m.

Next, a method of manufacturing the wiring integrated flexure according to this embodiment will be described with reference to the accompanying drawings by taking for example the case that the posts 30, the base bottom layer 32 and the protection layer 81 are formed from polyimide. FIGS. 7(*a*) to 7(*f*) respectively illustrate the steps of manufacturing the wiring integrated flexure.

A first resist 61 is, first, formed with openings therein respectively open to post-forming regions 30' on the stainless-steel substrate. The said first resist 61 may have a thickness of; for example, 15 to 25 $\mu$m. The polyimide precursor 35 thicker than the first resist 61 is, then, applied over the entire surface. The said polyimide precursor 35 may have such a thickness as to allow its surface to be positioned, for example, 5 to 10 $\mu$m higher than the first resist 61. The polyimide precursor 35 is, then, subjected to baking treatment so as to be cured, thereby forming a first polyimide precursor layer 35 (see FIG. 7(*a*)). The said baking treatment may be performed at a temperature of, for example, 100 to 200.degree. C.

A second resist 62 is, then, formed on post forming regions 30' and a base-bottom-layer forming region 32' of the first polyimide precursor layer 35, and the polyimide precursor layer 35 is etched with an alkaline solution such as KOH and TMAH by using the second resist 62 as a mask. FIGS. 7(*b*) and 7(*c*) are respectively a cross section taken along the lengthwise direction of the wiring structure and a plan view illustrating such a state. The second resist 62 is removed after etching the polyimide precursor layer 35.

As illustrated in FIG. 7(*d*), the build-up-forming conductive layer 55 is then formed entirely on the surface of the polyimide precursor layer 35 and the exposed surface of the first resist 61. The said build-up-forming conductive layer 55 may be, for example, a Cr/Cu layer having a thickness of approximately 0.1 $\mu$m, which is deposited by sputtering.

Subsequently, the first plating resist 56 is formed with the opening 56a therein open to a wiring-conductor-forming region of the build-up-forming conductive layer 55, and the wiring conductor 20 is formed on the surface of the build-up-forming conductive layer 55 exposed via the opening 56a. The said wiring conductor 20 may be, for example, a Cu/Ni/Au layer (thicknesses: 5 to 15 $\mu$m; 1 $\mu$m; and 1 $\mu$m, respectively). FIG. 7(*e*) is a cross section taken along the transverse direction to the lengthwise direction of the wiring structure.

The first plating resist 56 is then removed and the build-up-forming conductive layer 55 with the exception of the region corresponding to the wiring conductor 20 is etched out by using the wiring conductor 20 as a mask.

A polyimide precursor 35' is then applied to completely cover the wiring conductor 20, and is subjected to prebaking treatment so as to form a second polyimide precursor layer 35'. The said second polyimide precursor layer 35' is preferably dimensioned so as to have a thickness of approximately 2 to 5 $\mu$m on the wiring conductor 20. The said prebaking treatment may be performed at a temperature of, for example, 100 to 200.degree. C. A third resist 63 is formed on a region of the second polyimide precursor layer 35', which region corresponds to the posts and the base bottom layer. The second polyimide precursor layer 35' is etched by using the said third resist 63 as a mask so as to leave only a region of the second polyimide precursor layer 35' covering the wiring conductor 20. FIG. 7(*f*) is a cross section illustrating such a state. The second polyimide precursor layer 35' defines openings therein open to the terminal pad regions of the wiring conductor 20.

The first resist 61 and the third resist 63 are then removed, and the heat treatment is performed to modify the first polyimide precursor 35 and the second polyimide precursor 35' to polyimide, thereby forming the posts 30 each having a thickness of 15 to 30 $\mu$m, the base bottom layer 32 having a thickness of approximately 5 $\mu$m and the protection layer 81 having a thickness of 1 to 3 $\mu$m on the wiring conductor 20, all of which are made of polyimide. The heat treatment may be performed at a temperature of, for example, 300 to 400.degree. C.

The stainless-steel substrate 10 is, then, subjected to a forming operation so as to obtain the wiring integrated flexure 80 according to this embodiment. The said forming operation may be accomplished, for example, by forming resists on the entire surface of the front side of the stainless-steel substrate, and predetermined regions of the rear side of the stainless-steel substrate to be left, and etching the substrate with an etching solution by using these resists as masks. The said etching solution may be, for example, a ferric-chloride-containing solution.

The first to third resists 61, 62 and 63 are of the type that can be developed and peeled off with acids for avoiding etching with an alkaline solution used in the etching process of the polyimide precursor layers 35 and 35'.

Instead of the wiring conductor 20 of this embodiment, which includes the Ni/Au layer formed entirely on the Cu layer, the wiring conductor with its signal line portion made of the Cu layer only may be employed. In this case, the Ni/Au layer may be formed only on the regions of the wiring conductor 20 exposed via the openings of the protection layer 81 corresponding to the terminal pad regions.

The thus formed wiring integrated flexure 80 of this embodiment includes the protection layer 81 for covering the wiring conductor 20, thereby achieving protection of the wiring conductor 20 from the outside air, effective protection of the Cu layer in the wiring conductor from corrosion, and improved reliability of the wiring structure, in addition to the effects in the second embodiment.

Embodiment 4

A fourth embodiment of a wiring integrated flexure according to the present invention will be hereinafter described with reference to the accompanying drawings.

FIG. 8(a) is a longitudinal cross section of a wiring integrated flexure 90 in the signal line portion according to this embodiment. Hereinafter, corresponding or identical parts to those of each of the aforementioned embodiment have been given the same reference characters to omit a detailed description thereof.

As illustrated in FIG. 8(a), the wiring integrated flexure 90 of this embodiment is provided along both the longitudinal sides thereof with a protection pattern 91 with the wiring conductor there between. The said protection pattern 91 has an height equal to or higher than the wiring conductor 20, thereby reducing the load on the posts effected by a possible contact with any matters from above the flexure, and therefore preventing the wiring conductor 20 from being damaged or deformed.

While the protection pattern 91 may be made of various materials, it is preferably arranged with a base layer 92 formed on the stainless-steel substrate 10, and a protective conductor layer 93 formed on the said base layer 92 in such a manner as to be electrically isolated from the wiring conductor 20 and the stainless-steel substrate 10. With this arrangement, the protective pattern 91 can simultaneously be formed at the time of forming the wiring conductor 20, so that a cost increase by an additional manufacturing process can effectively be avoided. Specifically, while the base layers 92 can be formed from the same material as the posts 30 simultaneously at the time of forming the posts 30, the protective conductor layers 93 can be formed from the same material as the wiring conductor 20 simultaneously at the time of forming the said wiring conductor. Thus, the protection pattern 91 can effectively be formed. As a result of manufacturing the flexure according to this method, the protective conductor layer 93 has a height substantially equal to the wiring conductor 20.

In this embodiment, the explanation was given for the arrangement that the protection pattern 91 is arranged with the base layer 92 and the protective conductor layer 93. Instead of this arrangement, it is possible to employ a protection pattern 91' that is arranged with a protection layer 94 covering the protective conductor layer 93, in addition to the base layer 92 and the protective conductor layer 93.

FIG. 8(b) is a longitudinal cross section of the wiring integrated flexure 90' with the protection pattern 91' in the signal line portion, according to the third embodiment. The protection pattern 91' of FIG. 8(b) may simultaneously be formed at the time of forming the wiring conductor 20. Specifically, while the base layer 92 is formed from the same material as the posts 30 simultaneously at the time of forming the said posts 30, the protective conductor layer 93 is formed from the same material as the wiring conductor 20 simultaneously at the time of forming the said wiring conductor. Further, the protection layer 94 can be formed from the same material as the protection layer 81 on the wiring conductor 20 simultaneously at the time of forming the said protection layer 81.

The protection patterns 91 and 91' in this embodiment are formed so as to reduce a possible load on the posts 30, and therefore are preferably formed throughout the lengthwise direction of the wiring conductor 20. However, such an arrangement is not essential. For example, the protection patterns 91 and 91' may be formed only on the stainless-steel substrate 10 with the exception of the regions such as a gimbal region where the protection patterns 91 and 91' are hardly formed.

This specification is by no means intended to restrict the present invention to the preferred embodiments set forth therein. Various modifications to the wiring integrated flexure and the method of manufacturing the same, as described herein, may be made by those skilled in the art without departing from the spirit and scope of the present invention as defined in the appended claims.

What is claimed is:

1. A method of manufacturing a wiring integrated flexure including a stainless-steel substrate for supporting a magnetic head slider thereon, a wiring conductor formed on said stainless-steel substrate, posts made of polyimide and interposed between said stainless-steel substrate and said wiring conductor for electrically isolating said wiring conductor from said stainless-steel substrate, and said posts disposed along the lengthwise direction of said wiring conductor with spacing from each other, which comprises:

a first step of applying a polyimide precursor onto the entire surface of said stainless-steel substrate;

a second step of curing said polyimide precursor by prebaking to form a polyimide precursor layer;

a third step of forming a wiring conductor pattern on said polyimide precursor layer;

a forth step of forming resists on regions of said polyimide precursor layer to be respectively formed into said posts, and said wiring conductor pattern;

a fifth step of etching out said polyimide precursor layer by using said resists as masks;

and a sixth step of modifying said polyimide precursor layer left on said stainlesssteel substrate into a polyimide layer by heat treatment; wherein the method further including a step of forming an Ni/Au layer on the surface of said wiring conductor layer by electrolytic plating between the third step and the forth step, said third step including:

forming a build-up-forming conductive layer formed of a Cr layer on the entire surface of said polyimide precursor layer;

forming a plating resist on said build-up-forming conductive layer with the exception of a region thereof corresponding to said wiring conductor pattern;

forming an Au/Ni/Cu containing wiring conductor layer on the exposed surface of said build-up-forming conductive layer by electrolytic plating by using said plating resist as a mask;

and removing said plating resist and said build-up-forming conductive layer with the exception of a region thereof, in which said wiring conductor layer has been formed.

2. A method of manufacturing a wiring integrated flexure including a stainless-steel substrate for supporting a magnetic head thereon, a wiring conductor formed on said stainless-steel substrate, posts made of polyimide and interposed between said stainless-steel substrate and said wiring conductor for electrically isolating said wiring conductor from said stainless-steel substrate, said posts disposed along the lengthwise direction of said wiring conductor with spacing from each other, and a base bottom layer made of polyimide and formed between each post and an adjacent post thereto of said posts in contact with a bottom surface of said wiring conductor and with spacing from said stainless-steel substrate, which comprises:

a first step of applying a negative photosensitive polyimide onto the entire surface of said stainless-steel substrate;

a second step of curing said negative photosensitive polyimide by prebaking to form a photosensitive polyimide layer;

a third step of exposing the entire thickness of post forming regions of said negative photosensitive polyimide layer to light, said post forming regions respectively corresponding to said posts;

a forth step of exposing only a surface side of a base-bottom-layer forming region of said photosensitive polyimide layer to light, said base-bottom-layer forming region corresponding to said base bottom layer and including at least a region corresponding to said wiring conductor layer;

a fifth step of developing said negative photosensitive polyimide layer and subsequently subjecting the same to heat treatment so as to leave said entire thickness of said post forming regions of said photosensitive polyimide layer and said surface side of said base-bottom-layer forming region of said negative photosensitive polyimide layer located between adjacent posts of said posts, as a polyimide layer so as to form said posts and said base bottom layer;

a sixth step of forming a resist defining openings therein open to said posts and said base bottom layer;

a seventh step of depositing a Cr/Cu-containing build-up-forming conductive layer on the entire surface by sputtering, after forming said resist;

an eighth step of removing said resist so as to leave said build-up-forming conductive layer only on said posts and said base bottom layer;

a ninth step of forming a first plating resist defining an opening therein open only to a region of said build-up-forming conductive layer, said region corresponding to said wiring conductor;

a tenth step of forming a Cu-containing conductor layer on a region of said build-up-forming conductive layer exposed via said opening of said first plating resist, by electrolytic plating;

an eleventh step of removing said first plating resist and said build-up-forming conductive layer with the exception of said region thereof, on which said, Cu-containing conductor layer has been formed; and a twelfth step of forming a second plating resist on a region with the exception of said posts and said base bottom layer, and forming an Ni/Au layer on said Cu-containing conductor layer by electrolytic plating.

3. A method of manufacturing a wiring integrated flexure including a stainless-steel substrate for supporting a magnetic head thereon, a wiring conductor formed on said stainless-steel substrate, a protection layer made of polyimide and covering the surface of said wiring conductor, posts made of polyimide and interposed between said stainless-steel substrate and said wiring conductor for electrically isolating said wiring conductor from said stainless-steel substrate, said posts disposed along the lengthwise direction of said wiring conductor with spacing from each other, and a base bottom layer made of polyimide and formed between each post and an adjacent post thereto of said posts in contact with a bottom surface of said wiring conductor and with spacing from said stainless-steel substrate, which comprises:

a first step of forming on said stainless-steel substrate a first resist with openings therein respectively open to post-forming regions, said postforming regions respectively correspond to said posts;

a second step of applying a polyimide precursor on the entire surface of said first resist and regions of said stainless-steel substrate exposed via said openings, and forming a first polyimide precursor layer by prebaking;

a third step of forming a second resist on post forming regions and a base-bottom-layer forming region of said polyimide precursor, said post forming regions respectively corresponding to said posts, and said base-bottom-layer forming region corresponding to said base bottom layer;

a fourth step of etching out the exposed portion of said polyimide precursor layer by using said second resist as a mask;

a fifth step of etching out said second resist and depositing a build-up-forming conductive layer entirely on said first polyimide precursor layer left on said stainless-steel substrate and the exposed surface of said first resist by sputtering;

a sixth step of forming a plating resist on said build-up-forming conductive layer with the exception of a region thereof corresponding to said wiring conductor;

a seventh step of forming a wiring conductor layer on the exposed surface of said build-up-forming conductive layer by electrolytic plating by using said plating resist as a mask;

an eighth step of removing said plating resist and etching out the exposed portion of said build-up-forming conductive layer by using said wiring conductor layer as a mask;

a ninth step of applying a polyimide precursor entirely on the exposed surface of said first resist, the exposed surface of said first polyimide precursor and said wiring conductor layer in such a manner as to cover said wiring conductor layer, and forming a second polyimide precursor layer by prebaking;

a tenth step of forming a third resist on a region of said second polyimide precursor layer, said region corresponding to said posts and said base bottom layer;

an eleventh step of etching out the exposed portion of said second polyimide precursor layer by using said third resist as a mask, and leaving only a portion of said second polyimide precursor layer, said portion covering said wiring conductor; and and a twelfth step of removing said first resist and said third resist, and subjecting said first polyimide precursor layer and said second polyimide precursor layer left on said stainless-steel substrate to heat treatment to modify said first polyimide precursor layer and said second polyimide precursor layer respectively into polyimide layers so as to form said posts, said base bottom layer and said protection layer.

* * * * *